May 3, 1932.  H. W. NIEMAN  1,856,135
FRICTION CLUTCH
Filed Dec. 27, 1928  2 Sheets-Sheet 1

Inventor
Henry W. Nieman.
By R. S. A. Dougherty
Attorney

May 3, 1932. H. W. NIEMAN 1,856,135
FRICTION CLUTCH
Filed Dec. 27, 1928  2 Sheets-Sheet 2

Inventor
Henry W. Nieman,
By R. S. A. Dougherty
Attorney

Patented May 3, 1932

1,856,135

UNITED STATES PATENT OFFICE

HENRY W. NIEMAN, OF BETHLEHEM, PENNSYLVANIA, ASSIGNOR TO BETHLEHEM STEEL COMPANY, A CORPORATION OF PENNSYLVANIA

FRICTION CLUTCH

Application filed December 27, 1928. Serial No. 328,751.

My primary purpose is to provide a friction clutch capable of communicating torques whose amounts are practically uninfluenced by variations in the coefficients of friction of the materials used therein. The means and modes of realizing this purpose, as well as other purposes and utilities, can best be appreciated after several practical embodiments have been described and the principles and modes of operation analyzed.

Accordingly I refer to the accompanying drawings in which are shown several illustrative examples of the invention, in which drawings.

Figure 1:
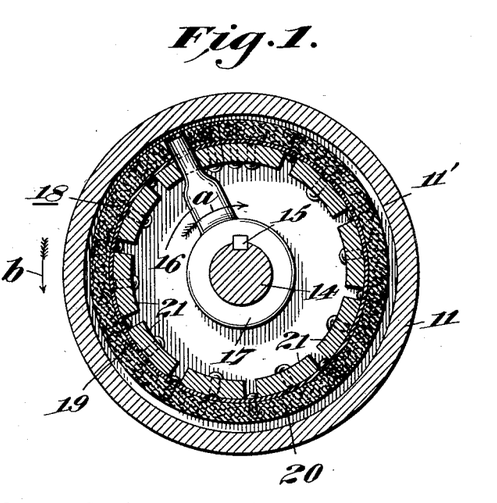
Fig. 1 is a vertical section through my clutch with the friction element in an inoperative position.
Figure 2:
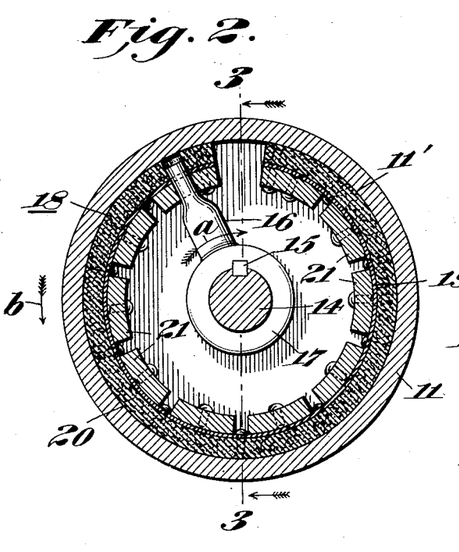
Fig. 2 is a similar section showing the position of the friction element when the clutch is operating.
Figure 3:
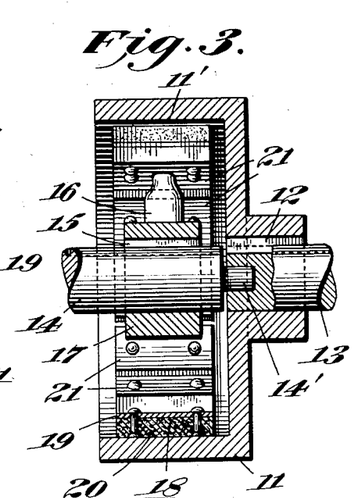
Fig. 3 is a section at right angles to those of Figs. 1 and 2, taken along the line 3—3 of Fig. 2.

Describing the device of Figs. 1, 2 and 3: Drum 11 is keyed at 12 to driven shaft 13 which is part of a machine to be driven, or is operatively connected thereto in any suitable manner. Keyed to driving shaft 14, at 15, is arm 16 which is here shown as being an integral part of hub 17 keyed to shaft 14. The outer portion of arm 16 is relatively restricted in diameter and is attached to structure 18 which I here designate as a flexible friction element.

This friction element comprises a flexible steel band 19 bent into a curved form as shown in Fig. 1. Secured to its outer surface in any suitable way is a facing 20 of friction material having a moderately high minimum coefficient of friction. In a clutch such as here shown the minimum coefficient of friction may well be about .35. Upon the inner surface of steel band 19 are riveted weights 21 which are uniformly distributed along the band and relatively close together. They may be of any suitable material as for example brass.

Starting the driving motor, driving shaft 14 is rotated with increasing speed in the angular direction indicated by arrow $a$, arm 16 with attached friction element 18 obviously being rotated therewith. The rotation of element 18 produces centrifugal action on the mass of this element, tending to force it outwardly toward the inner cylindrical bearing surface 11' of drum 11. As the greater proportion of the mass of the friction element is in weights 21 they contribute the greater part of the centrifugal force. When a sufficient speed of rotation has been attained the increasing centrifugal force "expands" the friction element until the friction facing slippingly engages the cylindrical bearing surface 11', as indicated in Fig. 2. With increasing speed of the motor and shaft 14 the centrifugal force, acting radially of bearing surface 11', likewise increases, forcing the friction element thereagainst. When the friction facing first engages the bearing surface the torque communicated to the drum is small but as the speed of the driving shaft increases, with the accompanying increase of centrifugal force, the torque gradually increases until, when the motor is operated at full speed, a maximum amount of torque is communicated.

Depending upon various factors, such as the resiliency of band 19, and the mass in the friction element, particularly weights 21, a particular speed of the driving shaft must be attained before the friction element can be sufficiently expanded to engage friction facing 20 with bearing surface 11', and a still greater speed before the friction element is pressed against the bearing surface with sufficient force to exercise any great amount of torque upon drum 11 and driven shaft 13.

As is readily apparent, this character of operation is very efficacious. The clutching is automatic. It is gradual in its action and places no excessive or sudden stress or shock upon the motor or the driven parts, nor even, for that matter, upon the clutch parts themselves. As an example of the usefulness of this kind of operation, consider the frequent demand that a motor get up to a particular speed before any great amount of load is placed upon it. It is important that the load be gradually "taken up"; that there be no abrupt access thereto. My clutch satisfies these demands. Obviously, by proper selection of the materials and dimensions of parts my clutch may be designed to effect an engagement of the flexible friction element with the bearing surface to communicate any substantial amount of torque only when the desired speed of the motor has been reached. After the initial engagement, the increase of torque, augmenting only with the increase of centrifugal force, is gradual, and occurs only in response to the accompanying increase in speed of the motor.

It is perhaps worthy of note that when the driven parts are at full speed there is no friction between the clutch parts as there is then no slippage between the friction element and the drum, they then rotating together practically as though integrally united.

But possibly the most significant aspect of my clutch, as embodied in this particular example, as well as in the others which will presently be described, is its practical independence of variations in the coefficient of friction of the friction materials used. Numerous investigations have demonstrated that the coefficient of friction of a material is not a constant value or one which varies but slightly, but that actually it is a quantity which alters greatly in service; frequently changing markedly in relatively short periods of time. It is now desired to point out how, in spite of great variations in the coefficient of friction in the material used, the torque which is transmitted with my clutch is, for all practical purposes, independent of such variations.

First, note concerning the clutch just described, that friction element 18 is tractively connected to arm 16 at one end but is otherwise relatively free; that the friction element is sufficiently flexible so that under the influence of the radially acting centrifugal force it will conform readily to the bearing surface during slippage relative thereto; that the radial forces on the friction element during action will be approximately uniformly distributed; and that the friction element is being rotated from the tractive connection at one end in the direction of arrow $a$. Under these conditions, the torque transmitted varies approximately as the product of the centrifugal force, per unit length of band, effective to press the friction element against the bearing surface, the square of the radius of the internal cylinder of the drum, and the factor $$\left(1-\frac{1}{e^{\mu\alpha}}\right)$$

in which ($e$) is the base of the natural system of logarithms ($\mu$) is the coefficient of friction of the material of the facing and ($\alpha$) is the angle of wrap of the friction element expressed in radians, that is, the angle of engagement of the friction element with the bearing surface of the drum. From this it is apparent that the only influence on torque transmission by variations of the coefficient of friction is in the quantity $$\left(1-\frac{1}{e^{\mu\alpha}}\right).$$

Obviously where the minimum coefficient of friction is .35 and the angle of wrap is that shown in Fig. 2 the quantity $$\left(\frac{1}{e^{\mu\alpha}}\right)$$

has a small value and the factor $$\left(1-\frac{1}{e^{\mu\alpha}}\right)$$

will obviously be only a little less than 1 and therefore this factor can have little effect upon the amount of torque transmitted. The greater the coefficient of friction the smaller the value of $$\left(\frac{1}{e^{\mu\alpha}}\right),$$

and the closer the approximation to unity of the factor $$\left(1-\frac{1}{e^{\mu\alpha}}\right).$$

Therefore it is evident that no matter how great the variation of the coefficient of friction above the minimum value given there will be but little alteration in the amount of torque.

Obviously I do not wish to be limited to a particular minimum coefficient of friction. The important thing is that with my clutch, designed and operated as given above the product ($\mu\alpha$) shall have a sufficient value to make $$\left(\frac{1}{e^{\mu\alpha}}\right)$$

negligible in any particular case.

Of course the requirements for constancy of torque transmission will be different for different cases. For example, a motor which is designed to permit a 25% overload will permit a greater variation of torque transmission than one which is designed for only a 10% overload. In the first case obviously ($\mu\alpha$) may be lesser value than in the latter. The important consideration is that for the particular needs of any case the torque transmission with my clutch may be independent of such variations as are of practical effect. The significant thing is that with my clutch it is possible to render great variations in the coefficient of friction of very small influence upon the torque transmission. For instance, in the embodiment which is being discussed, the coefficient of friction could vary over a range of several hundred percent and yet the torque would vary only by a relatively small percent.

It is probably unnecessary to state that to meet the needs of any particular situation one is not limited to any particular minimum coefficient of friction as it is possible to use a greater angle of wrap. Instead of using a segment as in the form here shown a spiral may be used with a corresponding great increase in the angle of wrap.

To obtain this practical constancy of torque with the device just described it is necessary that certain conditions of operation be observed. If the driving shaft in Figs. 1, 2 and 3 were to be reversed and arm 16 were to be rotated in a counter-clockwise direction, that is in an angular direction opposite to arrow $a$, we would get an entirely different result. So far from the torque being practically uninfluenced by variations in the coefficient of friction, as just indicated, every such variation would be greatly multiplied in its effect upon the torque. If, however, arm 16 were tractively connected to the other end of the friction element 18 instead of the end shown, rotation of the arm 16 would need to be in a counter-clockwise direction to obtain constancy of torque, and rotation in the angular direction of arrow $a$, in such case, would produce a torque which would vary greatly for every change in the coefficient of friction.

Because of the importance of the matter just mentioned, it may be well to briefly examine certain conditions which are present during the transmission of torque through this clutch. With the driving shaft, arm and friction element rotating in a clockwise direction as shown in Fig. 2, and communicating a torque to drum 11, the centrifugal force is acting radially on the element to press it against the bearing surface 11'. At the same time the friction element is slipping relative to the bearing surface 11', which means in other words, that said bearing surface has, in effect, a relative angular motion in the direction of arrow $b$. As a conjoint result of these two actions, that is of the radially directed force due to centrifugal action and the slippage of the friction element over the bearing surface of the drum, the friction element is subjected to longitudinal stress, which in this case is a tension, diminishing in intensity from the connected end to the free end thereof. It should be remembered that in this case a constant torque is secured.

Now, if, with the same tractive connection of arm 16 to the friction element, the rotation were in the opposite direction that is counter to arrow $a$, centrifugal force would still act radially and there would be slippage relative to the bearing surface, such slippage however being in the reverse direction to that of the preceding case. As a consequence, longitudinal stress would also be produced but in this case it would be a compression instead of a tension. In this case the torque is not practically constant with variations in the coefficient but the torque would vary markedly.

The reason why this reversal produces such an effect is because of the fact that with a compression instead of tension the formula expressive of the torque becomes different. As above pointed out when the rotation is in the proper direction the torque is a product of several factors one of which is $$\left(1-\frac{1}{e^{\mu\alpha}}\right).$$

Upon reversing the direction of rotation and producing a compression instead of a tension, that factor must be replaced by the following factor:

$$\left(1+\frac{1}{e^{\mu\alpha}}\right).$$

It will be readily apparent from this latter formula that every variation of the co-efficient of friction will greatly alter the values of the torque transmitted.

Thus we have a means of determining the proper direction of rotation to secure torque independent of variations of the coefficient of friction during service. With an internal cylindrical bearing surface, the rotation of the member tractively connected to one end of the friction element must be in such a direction as to put the friction element under tension.

As will be readily apparent, it is not essential that shaft 14 be the driving member and shaft 13 the driven member. The clutch would be effective with a reversal of action, the torque then being transmitted through drum 11 friction element 18 arm 16 to shaft 14. In such a mode of operation it is evident from our test just given that drum 11 should rotate in the direction of arrow $b$ to place the friction element under tension and thus have the proper angular direction of rotation to get constancy of torque.

Figures 4, 5:
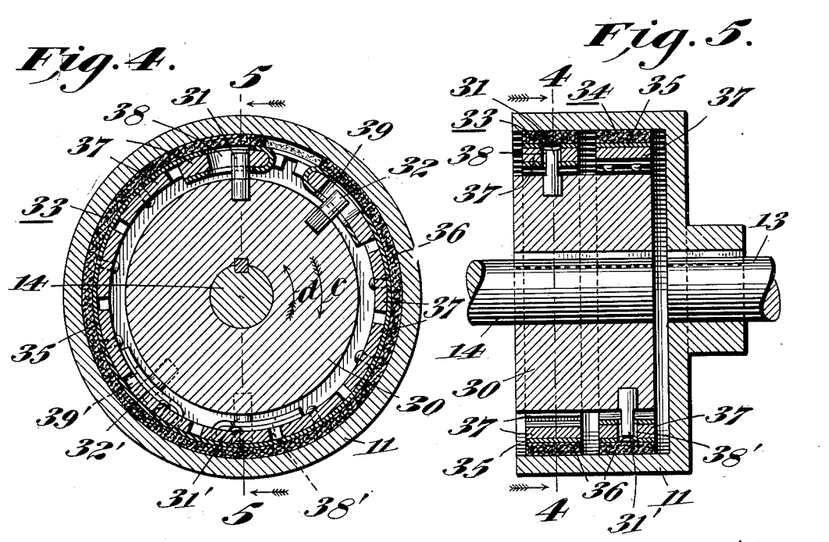
Fig. 4 is a vertical section through a modified form of clutch capable of operating in both directions and having two friction elements instead of one, as in Figs. 1 to 3 inclusive.
Fig. 5 is a section of the same modification as Fig. 4, taken at right angles thereto, along the line 5—5.

In Figs. 4 and 5 I show a clutch involving the same general mode of operation but which may be operated in either direction. Moreover, it differs from that of the first described form in being better balanced. The same general relationship exists between driving and driven shafts 14 and 13 and hollow drum 11, except there being no communication between the two shafts to maintain axial alignment. Keyed to driving shaft 14 is the solid drum 30 to which are secured pins 31, 31', 32 and 32'; pins 31 and 32 being disposed a relatively small angular distance apart as are also pins 31' and 32'; pin 31 being diametrically opposite to pin 31' and pin 32 diametrically opposite to pin 32'; pins 31' and 32', however, being disposed longitudinally of the drum 30 in a different plane from pins 31 and 32.

This form of clutch is provided with two friction elements 33 and 34. These friction elements are similar to that of the clutch of Figs. 1, 2 and 3 having steel bands 35 provided with facings of friction material 36 secured to the outer face of the band, and uniformly disposed weights 37 secured to the inner face thereof.

Near the two ends of friction element 33 are openings 38 and 39 adapted to overlie pins 31 and 32 respectively. Friction element 34 has similar openings 38' and 39' adapted to overlie pins 31' and 32'.

As this device is to be operable in either direction, these openings are of a substantially greater dimension longitudinally of the friction element than the diameter of the pins. Furthermore, it will be noted that the depth of the openings is sufficiently great to permit of a substantial amount of movement of the friction element longitudinally of the pins; that is the connection of the friction elements to the driving drum is such as to permit of a substantial amount of movement of the ends of the friction elements radially.

Upon starting the motor to rotate drum 30 in the angular direction indicated by arrow $c$, pin 31 tractively engages the end of the friction element 33, pin 31' similarly engaging the end of friction element 34. As the motor gets up speed the same sequence of effects is produced in the clutching operation as in the previously disclosed form.

Because of the greater dimension of the openings at the ends of the friction elements than the diameter of the pins, pins 32 and 32' are out of tractive engagement with the bands during the rotation of the drum in the angular direction of arrow $c$. Upon rotating drum 30 in the reverse direction, that is in the angular direction indicated by the arrow $d$, pins 32 and 32' now tractively engage the opposite ends of the friction elements, pins 31 and 31' now moving into a non-engaging relationship to the friction elements.

An important feature of this embodiment of my invention is its capacity to be used as a flexible coupling. It will be noted that while the driving and driven members of Figs. 1 to 3 inclusive are maintained in an axial relationship by the pilot connection 14', driving and driven shafts 14 and 13 of the present form have no direct connection, the only connection of any sort between these member being that obtained through the frictional engagement of the flexible friction elements, operatively connected at their ends with the driving drum 30, with drum 11 keyed to the driven shaft. As is evident, the tractive connection of the driving drum 30 with the ends of the friction element is not a rigid one but permits substantial movement of the ends of the friction elements radially of the drums. Consequently driving and driven shafts 14 and 13 are capable of angular and transverse displacements relative to each other, and therefore permit the use of the device as a flexible coupling.

Figures 6, 7:
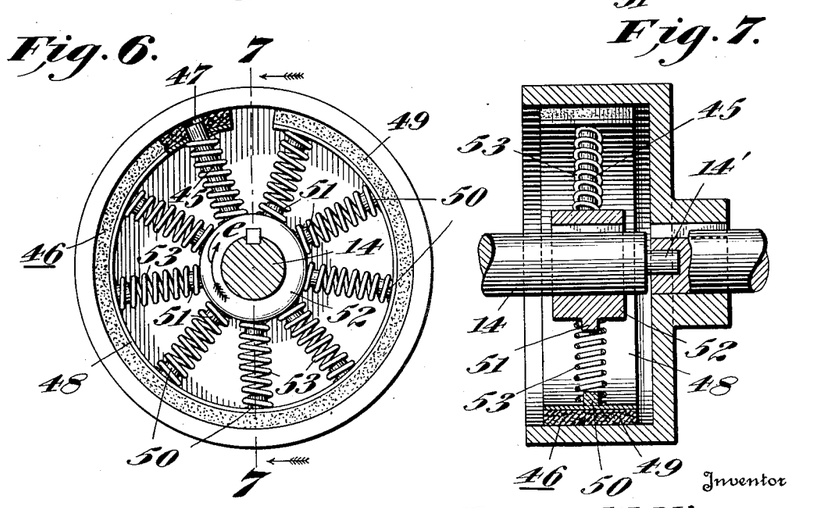
Fig. 6 is a vertical section of a modification showing the use of radially acting springs instead of weights, as in the preceding forms.
Fig. 7 is a section of the same modification at right angles to that of Fig. 6, taken along the line 7—7.

To obtain independence from variations of friction coefficient I am not limited to centrifugal force to press the band radially against the bearing surface. For example, springs may be used as indicated in Figs. 6 and 7, which illustrate a form similar in many respects to those previously described, the general relationship of drum and driving and driven shafts being the same. Keyed to the driving shaft 14 is an arm 45 which is connected to the flexible friction element 46 at 47 in a manner similar to the corresponding connection of the first described form. This flexible friction element comprises steel band 48 and a facing of friction material 49 secured thereto. At uniformly spaced intervals pins 50 are secured to the internal face of band 48 to project inwardly thereof. Studs 51, equal in number to pins 50, and spaced the same angular distance apart, as pins 50, are formed on hub 52 which carries arm 45.

Compression springs 53 are interposed between the hub and the friction element the pins on the hub and band and arm 45 holding them in the desired spaced relationship. These springs are of substantially equal strength of such an amount as to press the friction facing against the internal cylindrical bearing surface of the drum with the desired amount of force.

In this embodiment of my invention the friction element transmits torque as soon as the motor starts, the amount of torque being transmitted depending primarily upon the strength of springs 53; and therefore centrifugal action has a minor influence. Of course the mass of the friction element does produce a certain amount of centrifugal force acting radially, but with such speeds as are usually employed, this is relatively small in comparison with the force exerted by the springs. This form of clutch is suitable when it is desired to transmit torque which is more nearly independent of the speed of rotation.

In this form, the same test applies for determining the particular direction of rotation of parts to secure independence from variations in the coefficient of friction. Note that the driving shaft 14 and arm 45, with attached friction element 46, rotate in the direction of arrow *e*. Under this condition the friction element is placed under tension and, as in the preceding forms, torque is transmitted which is practically independent of the coefficient of friction.

Although the means shown, in the illustrative embodiment of the invention here given, for pressing the friction element against the bearing surface are indicated as exerting substantially equal radial forces on the friction element, this does not mean that the friction element is pressed against the bearing surface with the same force at all parts. Take the form of the invention shown in Figs. 6 and 7. Here each of the springs exerts practically the same radial force on the friction element as each of the others. In other words the radial forces applied to the friction element are equal. But, as a result of the rotation of the band relative to the bearing surface during slippage the resultant pressure exerted by the band on the bearing surface varies at different parts thereof. Actually the greatest pressure which the band exerts against the bearing surface is at the free or unconnected end of the friction element, diminishing along the band to the connected end where the pressure exerted is the least.

As pointed out earlier in this specification, the practical demands for constancy of torque vary with different needs. What is a non-permissible variation in one case is of no practical significance in another. Accordingly, certain departures may be made from the ideal conditions in designing my clutch for particular needs and yet one may obtain "practical" constancy of torque, that is sufficient constancy for the particular need. For example, in each of the illustrations of my invention here given the force applying elements, whether weights or springs, are represented to be equal in radially directed force, and are also shown as being distributed equal angular distances apart. Naturally this will more nearly approximate the ideal conditions, but in actual practice such conditions may be departed from somewhat. For example, in the form of Fig. 1 the weights might vary somewhat in mass, or they might be placed at somewhat different distances apart. Again, while the drawings show the friction elements as having facings of substantially the same thickness throughout its length there may be conditions where it would be desirable to make the facing thicker at the ends. This might well be true of the free ends in the forms shown as the greatest wear will occur at these free ends. While these changes may render the torque less independent of variations in coefficient of friction, they might well be made in many cases and yet come within the permissible variation of torque.

In each of these illustrative forms of my invention there is a flexible friction element which is adapted to wrappingly engage a cylindrical bearing surface, specifically here shown as an internal cylinder, and which is tractively connected at one end to either the driving or the driven member. In the form shown the tractive connection with one end of the friction element is in the nature of a pull and the longitudinal stress which is produced in the friction element during operation is a tension.

The main utilities of my invention will be readily apparent. Once the motor is at full speed each of the clutches previously described exerts a practically constant amount of torque. Consequently the load is gradually and regularly applied to the motor. Fluctuations in the work demands of the driven apparatus do not substantially affect such constancy of torque and as a result overload of the motor is obviated. These characteristics of my clutch are of obvious value in driving apparatus of considerable inertia with a constant speed motor.

Having thus described my invention what I claim and desire to secure by Letters Patent is:

1. In a clutch, a driving member, a driven member, one of said members having a curved bearing surface, a flexible friction element tractively connected at an end to one of said members and adapted to wrappingly engage said curved bearing surface of the other of said members, and means substantially uniformly distributed along the friction element effective as a result of the rotation of one of said members to force said friction element radially against said bearing surface, the product of the minimum co-efficient of friction and the angle of wrap of the flexible friction element being sufficiently great so that the torque transmitted is practically independent of variations of the co-efficient of friction.

2. In a clutch, a driving member, a driven member, one of said members having an internal cylindrical bearing surface, a flexible friction element tractively connected at an end to one of said members and adapted to wrappingly engage said internal bearing surface of the other of said members, and means effective as a result of the rotation of one of said members to exert force along said friction element in directions radially of said bearing surface to force said friction element against said bearing surface, the product of the minimum co-efficient of friction and the angle of wrap of the flexible friction element being sufficiently great so that the torque transmitted is practically independent of variations of the co-efficient of friction.

3. In a clutch, a driving member, a driven member, one of said members having an internal cylindrical bearing surface, a flexible friction element tractively connected at an end to one of said members and adapted to wrappingly engage said internal bearing surface of the other of said members, sufficient mass being disposed along the flexible friction element to cause the same to be forced against said bearing surface by centrifugal action, the product of the minimum co-efficient of friction and the angle of wrap of the flexible friction element being sufficiently great so that the torque transmitted is practically independent of variations of the co-efficient of friction.

4. In a clutch, a driving member, a driven member, one of said members having an internal cylindrical bearing surface, a flexible friction element tractively connected at an end to one of said members and adapted to wrapping engage said internal bearing surface of the other of said members, and weights distributed along the flexible friction element to cause same to be forced against said bearing surface by centrifugal action, the product of the minimum co-efficient of friction and the angle of wrap of the flexible friction element being sufficiently great so that the torque transmitted is practically independent of variations of the co-efficient of friction.

5. In a clutch, a driving member, a driven member, one of said members having an internal cylindrical bearing surface, a flexible friction element tractively connected at an end to one of said members and adapted to wrappingly engage said internal bearing surface of the other of said members, and force exerting means substantially uniformly distributed along the friction element, effective as a result of the rotation of one of said members to force said friction element against said bearing surface radially thereof, the product of the minimum co-efficient of friction and the angle of wrap of the flexible friction element being sufficiently great so that the torque transmitted is practically independent of variations of the co-efficient of friction.

6. In a clutch, a driving member, a driven member, one of said members having an internal cylindrical bearing surface, a flexible friction element tractively connected at an end to one of said members and adapted to wrappingly engage said internal bearing surface of the other of said members, said friction element being adapted as a result of the rotation of one of said members to exert force in directions radially of said bearing surface along the length of the friction element to press the friction element against said bearing surface, the product of the minimum co-efficient of friction and the angle of wrap of the flexible friction element being sufficiently great so that the torque transmitted is practically independent of variations of the co-efficient of friction.

7. In a clutch, a driving member, a driven member, one of said members having an internal cylindrical bearing surface, a flexible friction element tractively connected at an end to one of said members and adapted to wrappingly engage said internal bearing surface of the other of said members, said friction element being adapted as a result of the rotation of one of said members to exert force in directions radially of the bearing surface practically uniformly along the length of the friction element to press the friction element against said bearing surface, the product of the minimum co-efficient of friction and the angle of wrap of the flexible friction element being sufficiently great so that the torque transmitted is practically independent of variations of the co-efficient of friction.

8. In a clutch, a driving member, a driven member, one of said members having a cylindrical bearing surface, a flexible friction element tractively engageable with either end according to the angular direction of rotation of the driving member, and adapted to wrappingly engage the bearing surface of the other of said members, and to exert force in directions radially of the bearing surface along the length of the friction element to press the friction element against said bearing surface, the product of the minimum co-efficient of friction and the angle of wrap of the flexible friction element being sufficiently great so that the torque transmitted is practically independent of variations of the co-efficient of friction.

9. In a clutch, a driving member, a driven member, one of said members having a cylindrical bearing surface, a flexible friction element tractively enagageable with either end according to the angular direction of rotation of the driving member, and adapted to wrappingly engage the bearing surface of the other of said members, and force applying means disposed along the friction element to exert a force on said friction element radially of the bearing surface to press said friction element against said bearing surface, the product of the minimum co-efficient of friction and the angle of wrap of the flexible friction element being sufficiently great so that the torque transmitted is practically independent of variations of the co-efficient of friction.

10. In a clutch, a driving member, a driven member, one of said members having an internal curved bearing surface, a flexible friction element tractively engageable with either end accordingly to the angular direction of rotation of the driving member, and adapted to wrappingly engage said bearing surface of the other of said members, and means effective as the result of the rotation of one of said members to force the friction element along its length against said bearing surface radially thereof, the product of the minimum co-efficient of friction and the angle of wrap of the flexible friction element being sufficiently great so that the torque transmitted is practically independent of variations of the co-efficient of friction.

11. In a clutch, a driving member, a driven member, one of said members having an internal curved bearing surface, a flexible friction element tractively engageable with either end according to the angular direction of rotation of the driving member, and adapted to wrappingly engage said bearing surface of the other of said members, and force applying elements disposed along the friction element to exert force on said friction element radially of the bearing surface to press said friction element against said bearing surface, the product of the minimum co-efficient of friction and the angle of wrap of the flexible friction element being sufficiently great so that the torque transmitted is practically independent of variations of the co-efficient of friction.

12. In a clutch adapted to act as a flexible coupling, a driving member, a driven member, said members being capable of angular and transverse displacements relative to each other, one of said members having an internal cylindrical bearing surface, a flexible element tractively connected at an end to one of said members and adapted to wrappingly engage said bearing surface of the other of said members, sufficient mass being disposed along the flexible friction element to cause the same to be forced against said bearing surface by centrifugal action, the product of the minimum co-efficient of friction and the angle of wrap of the flexible friction element being sufficiently great so that the torque transmitted is practically independent of variations of the co-efficient of friction.

13. In a clutch, a driving member, a driven member, one of said members having an internal cylindrical bearing surface, a flexible friction element tractively connected at one end to one of said members, said friction element comprising a flexible band provided on one side with a friction surface adapted to engage the internal cylindrical surface, and a plurality of substantially uniform weights uniformly distributed along the band on its opposite side, the product of the minimum co-efficient of friction and the angle of wrap of the flexible friction element being sufficiently great so that the torque transmitted is practically independent of variations of the co-efficient of friction.

In testimony whereof I hereunto affix my signature.

HENRY W. NIEMAN.

Certificate of Correction

Patent No. 1,856,135. May 3, 1932.

HENRY W. NIEMAN

It is hereby certified that error appears in the printed specification of the above-numbered patent requiring correction as follows: Page 3, between lines 103 and 105, strike out the formula and insert instead—

$$(+e^{ua})$$

and that the said Letters Patent should be read with this correction therein that the same may conform to the record of the case in the Patent Office.

Signed and sealed this 18th day of October, A. D. 1932.

[SEAL.]
M. J. MOORE,
*Acting Commissioner of Patents.*

Certificate of Correction

Patent No. 1,856,135. May 3, 1932.

HENRY W. NIEMAN

It is hereby certified that Certificate of Correction issued October 18, 1932, in the above numbered patent was erroneously drawn as to the formula, and that the formula should read—

$$(1+e^{na})$$

so that the said Certificate may conform to the record of the case in the Patent Office.

Signed and sealed this 20th day of December, A. D. 1932.

[SEAL.]
M. J. MOORE,
*Acting Commissioner of Patents.*